(12) United States Patent
Gilley

(10) Patent No.: US 10,595,471 B2
(45) Date of Patent: Mar. 24, 2020

(54) SYSTEM AND METHODS FOR DIRECTING PLANT GROWTH

(71) Applicant: Ian Gilley, Cranston, RI (US)

(72) Inventor: Ian Gilley, Cranston, RI (US)

(*) Notice: Subject to any disclaimer, the term of this patent is extended or adjusted under 35 U.S.C. 154(b) by 247 days.

(21) Appl. No.: 15/927,687

(22) Filed: Mar. 21, 2018

(65) Prior Publication Data

US 2018/0271028 A1    Sep. 27, 2018

Related U.S. Application Data

(60) Provisional application No. 62/476,482, filed on Mar. 24, 2017.

(51) Int. Cl.
*A01G 9/12* (2006.01)
*A01G 7/06* (2006.01)

(52) U.S. Cl.
CPC .............. *A01G 9/128* (2013.01); *A01G 7/06* (2013.01); *Y10S 292/60* (2013.01); *Y10T 403/32032* (2015.01)

(58) Field of Classification Search
CPC .......... A01G 9/128; A01G 17/10; A01G 9/12; A01G 17/04; A01G 17/06
See application file for complete search history.

(56) References Cited

U.S. PATENT DOCUMENTS

| 3,309,258 | A | * | 3/1967 | Gallo | A01G 5/04 |
| | | | | | 248/27.8 |
| 4,619,433 | A | * | 10/1986 | Maier | E04G 11/065 |
| | | | | | 249/153 |
| 4,688,961 | A | * | 8/1987 | Shioda | F16B 7/04 |
| | | | | | 24/336 |
| 5,582,488 | A | * | 12/1996 | Dudley | A63H 33/042 |
| | | | | | 403/103 |
| 9,420,751 | B2 | | 8/2016 | Akana | A01G 9/12 |
| 10,264,736 | B2 | * | 4/2019 | Rider | A01G 9/12 |
| 2008/0069630 | A1 | * | 3/2008 | Bevirt | F16M 11/40 |
| | | | | | 403/56 |
| 2014/0115964 | A1 | * | 5/2014 | Akana | A01G 9/12 |
| | | | | | 47/1.01 S |
| 2016/0295811 | A1 | * | 10/2016 | Rider | A01G 9/12 |
| 2018/0249643 | A1 | * | 9/2018 | Akana | A01G 9/128 |

FOREIGN PATENT DOCUMENTS

| CA | 2276877 A1 * | 1/2001 | .............. A01G 9/12 |
| CA | 2831425 A1 * | 4/2014 | .............. A01G 7/06 |
| EP | 2661957 A1 * | 11/2013 | .............. A01G 9/12 |

* cited by examiner

*Primary Examiner* — Magdalena Topolski
*Assistant Examiner* — Kevin M Dennis
(74) *Attorney, Agent, or Firm* — Hayes Soloway P.C.

(57) ABSTRACT

Systems and methods for directing plant growth include a first attachment unit and a second attachment unit, both units being identical. Each attachment unit includes a body. A linking head is connected to the body and has at least one or a tab and a plurality of grooves. The linking head is substantially circular in shape. Each attachment unit also includes a linking base connected to the body and having another of a tab and a plurality of grooves. The linking base of the first unit is sized to fit together with the linking head of the second unit. The linked attachment units are angularly positionable by placing the tab into one of the plurality of grooves. The system also includes at least one band connectable between the attachment units and a plant.

20 Claims, 6 Drawing Sheets

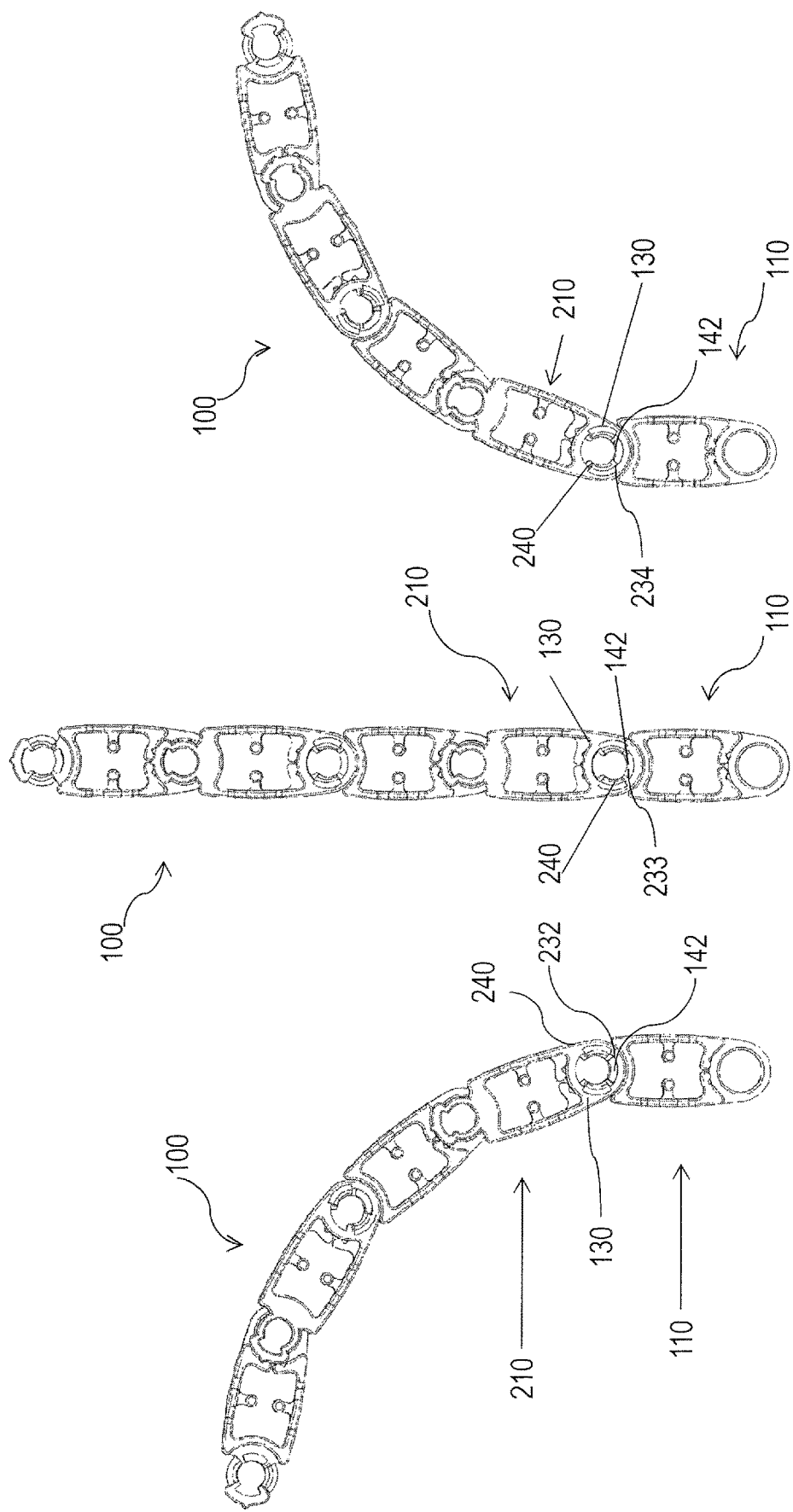

600

Link at least a first attachment unit and a second attachment unit, wherein the attachment units are identical, and wherein each attachment unit comprises: a body; a linking head connected to the body and having at least one of: a tab and a plurality of grooves, wherein the linking head is substantially circular in shape; and a linking base connected to the body and having another of: a tab and a plurality of grooves, wherein the linking base of the first unit is sized to fit together with the linking head of the second unit
610

Position the linked attachment units against a stem of a plant
620

Connect at least one band between the attachment units and the plant
630

Angularly position the plant by placing the tab into one of the plurality of grooves
640

FIG. 6

SYSTEM AND METHODS FOR DIRECTING PLANT GROWTH

CROSS REFERENCE TO RELATED APPLICATION

This application claims benefit of U.S. Provisional Application Ser. No. 62/476,482, titled "Urban Garden Stem Master, filed Mar. 24, 2017, the entire disclosure of which is incorporated herein by reference.

FIELD OF THE DISCLOSURE

The present disclosure is generally related to gardening and more particularly is related to systems and methods for directing plant growth.

BACKGROUND OF THE DISCLOSURE

Urban gardens are gardens grown in environments where space and lighting conditions may be limited. For instance, many urban gardens are located in close proximity to buildings, on rooftops, or even inside in grow tents and small spaces, Indoor gardens are especially subject to limited space and sufficient lighting, which can lead to issues during plant growth. One issue is that indoor light sources are generally fixed in a stationary position, and do not move as the sun does during the day. As a consequence, a plant's upper leaves may shadow lower growth. Parts of plants that are more directly exposed to indoor grow lights may grow more quickly than parts of plants located farther away, or growth located underneath taller sections of the plant. This may lead to an unevenly developed plant or lower yield for the plants that do not receive enough light. Another issue is that younger plants and shoots may not be allowed to grow as quickly.

Various techniques are used to care for and maximize the growth and yield of urban gardening efforts, including pruning, moving branches with string a wire, and applying stakes and trellises to growing plants. However, growers can only prune so much. The use of string and wire to is potentially harmful to the plant as stems and branches may bend beyond their breaking point. And anything that has been tied down can no longer naturally move and grow with the plant as it is bound into a stationary position.

Thus, a heretofore unaddressed need exists in the industry to address the aforementioned deficiencies and inadequacies.

SUMMARY OF THE DISCLOSURE

Embodiments of the present disclosure provide a system and method for directing plant growth. Briefly described, in architecture, one embodiment of the system, among others, can be implemented as follows. A system for directing plant growth includes a first attachment unit and a second attachment unit, both units being identical. Each attachment unit includes a body. A linking head is connected to the body and has at least one of a tab and a plurality of grooves. The linking head is substantially circular in shape. Each attachment unit also includes a linking base connected to the body and having another of a tab and a plurality of grooves. The linking base of the first unit is sized to fit together with the linking head of the second unit. The linked attachment units are angularly positionable by placing the tab into one of the plurality of grooves. The system also includes at least one band connectable between the attachment units and a plant.

The present disclosure can also be viewed as providing another system for directing plant growth. Briefly described, in architecture, one embodiment of the system, among others, can be implemented as follows. A system for directing plant growth includes a first attachment unit and a second attachment unit, both units being identical. Each attachment unit includes a body. A linking head is connected to the body and has at least one of a tab and a plurality of grooves. The linking head is substantially circular in shape. Each attachment unit also includes a linking base connected to the body and having another of a tab and a plurality of grooves. The linking base of the first unit is sized to fit together with the linking head of the second unit. The linked attachment units are angularly positionable by placing the tab into one of the plurality of grooves. The system also comprises a plant. At least one band is connectable between the attachment units and the plant, and the plant is directed according to the angular position of the linked attachment units.

The present disclosure can also be viewed as providing methods of directing plant growth. In this regard, one embodiment of such a method, among others, can be broadly summarized by the following steps: linking at least a first attachment unit and a second attachment unit, wherein the attachment units are identical, and wherein each attachment unit comprises: a body, a linking head connected to the body and having at least one of a tab and a plurality of grooves, wherein the linking head is substantially circular in shape, and a linking base connected to the body and having another of a tab and a plurality of grooves, wherein the linking base of the first unit is sized to fit together with the linking head of the second unit; positioning the linked attachment units against a stem of a plant; connecting at least one band between the attachment units and the plant; and angularly positioning the plant by placing the tab into one of the plurality of grooves.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 3A-3C are elevation views of angular positions of the system for directing plant growth, in accordance with the first exemplary embodiment of the disclosure.

FIG. 6 is a flowchart illustrating a method of directing plant growth, in accordance with the first exemplary embodiment of the present disclosure.

DETAILED DESCRIPTION

Figure 1:
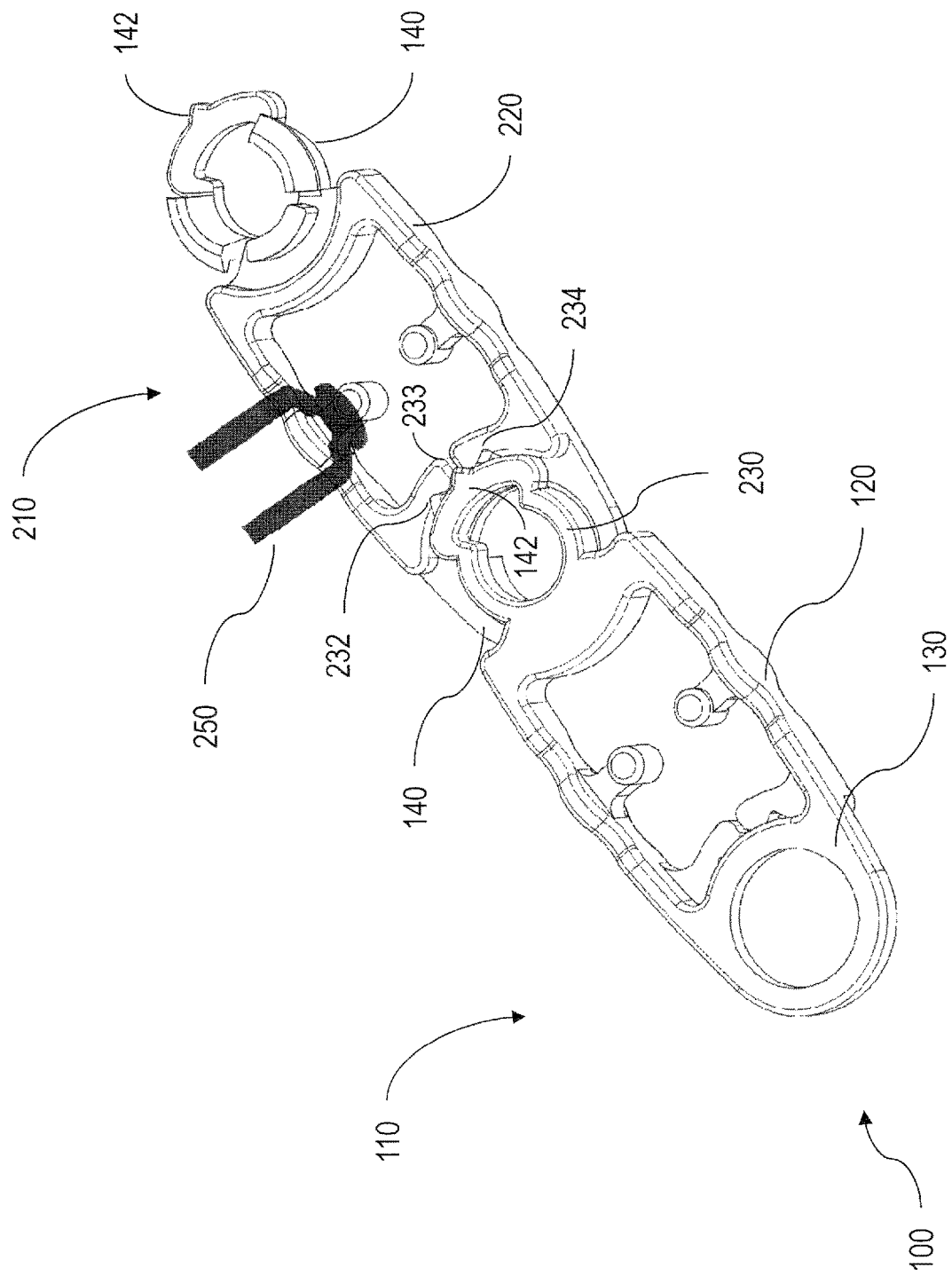
FIG. 1 is a plan view of a system for directing plant growth, in accordance with a first exemplary embodiment of the present disclosure.

FIG. 1 is a plan view of a system for directing plant growth, in accordance with a first exemplary embodiment of the present disclosure. The system 100 for directing plant growth includes a first attachment unit 110 and a second attachment unit 210, both units being identical. Each attachment unit 110, 210 includes a body 120, 220. A linking head 130, 230 is connected to the body 120, 220 and has at least one of a tab 142 and a plurality of grooves 232, 233, 234. The linking head 130, 230 is substantially circular in shape. Each attachment unit 110, 210 also includes a linking base 140, 240 connected to the body 120, 220 and having another of a tab 142 and a plurality of grooves 232, 233, 234. The linking base 140 of the first unit 110 is sized to fit together with the linking head 230 of the second unit 210. The linked attachment units 110, 210 are angularly positionable by placing the tab 142 into one of the plurality of grooves 232, 233, 234. This is discussed in greater detail in FIGS. 3A-3C, below. The system also includes at least one band 250 connectable between the attachment units 110, 210 and a plant.

Figure 2:
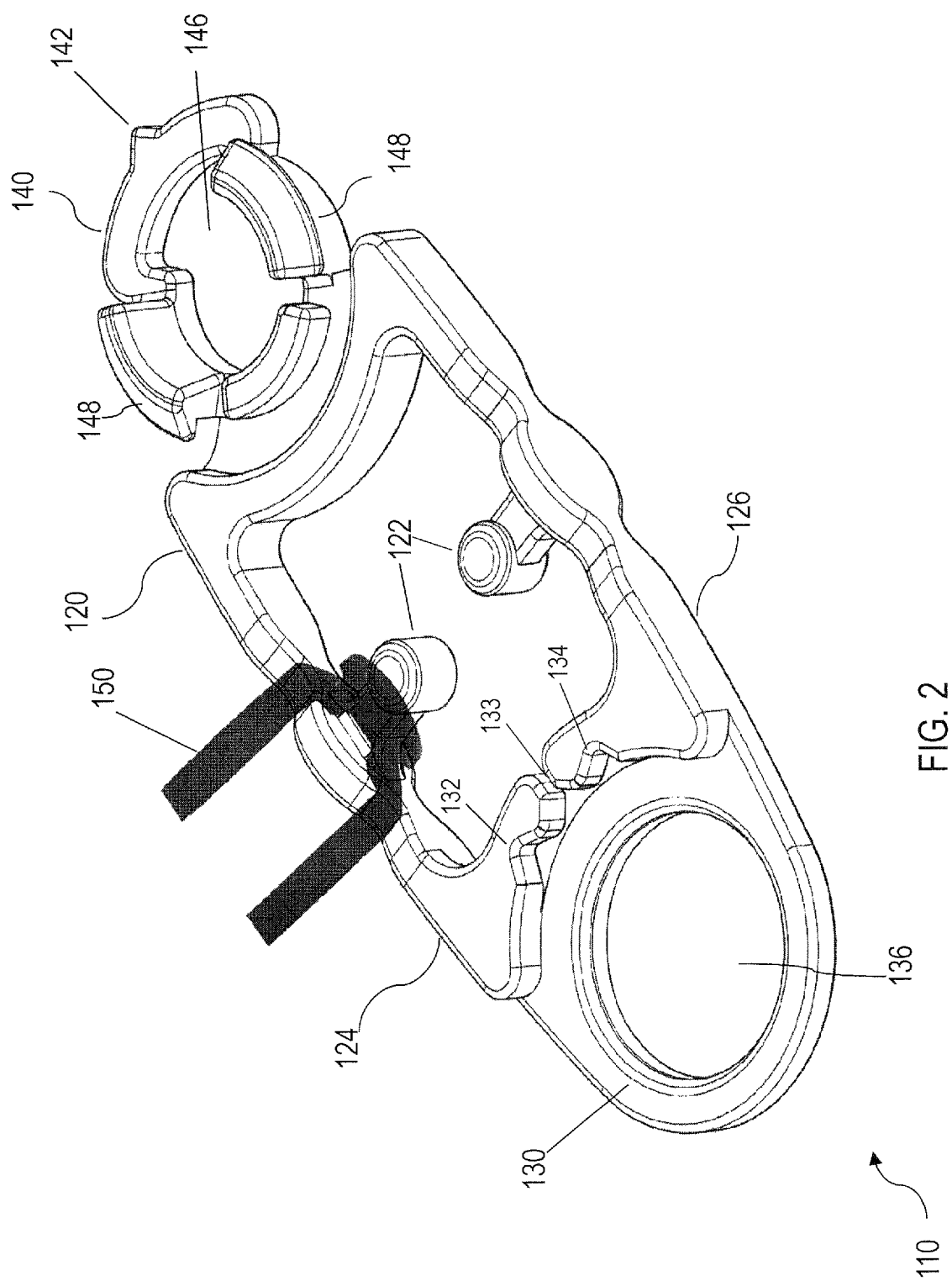
FIG. 2 is a plan view of an attachment unit of the system for directing plant growth, in accordance with the first exemplary embodiment of the present disclosure.

FIG. 2 is a plan view of an attachment unit 110, in accordance with the first exemplary embodiment of the present disclosure. With reference to FIGS. 1-2, the attachment unit 100 includes a body 120, a linking head 130, and a linking base 140. The linking head 130 and the linking base 140 are connected to the body 120. In one example, the linking head 130 and the linking base 140 may be connected at opposite ends of the body 120. In another example, the linking head and linking base 130, 140 may be connected to the body 120 at an angle, or on opposite sides, in order to achieve a desired shape, structure, or angular deviation from the system 100. In one example, each attachment unit 110 in the system 100 may be identical or substantially identical in implementation. In another example, different attachment units 100 may vary in size, shape, weight, or any combination thereof.

The attachment unit 110 is shown as having a unitary construction, wherein the body 120, linking head 130, and linking base 140 are formed together as a single piece. In one example, the body may be formed separately from the linking head 130 and/or the linking base 140. The attachment unit 110 may be formed from any suitable rigid material, such as plastic, polymers, glass, metal, ceramics, wood, rubber, or any combination thereof. In one example, the attachment unit 110 may be formed of one or more softer materials, such as soft rubber, paper, cardboard, Styrofoam, and the like, and may bend or give way as the plant grows stronger. In another example, the attachment unit 110 may be made of biodegradable materials that may decompose into the soil after use. In one example, the attachment unit 110 may be formed by any suitable process, such as casting, molding, or pressing. In another example, the attachment unit 110 may be formed by 3D printing or other suitable methods.

The body 120 is shown as a rigid member having a substantially rectangular outline and a hollow center. Any suitable shape may be used, however, a substantially rectangular design may provide support at the linking head 130 and linking base 140 without compromising length along the longer members 124, 126 of the body 120. In implementation, the attachment unit 110 may be connected to the plant (not shown) along the longer members 124, 126. The body 120 may include at least one hook 122 along the longer members 124, 126. In one example, one hook 122 is located on each member 124, 126. This may allow the attachment unit to be useful in multiple orientations. The hooks 122 may provide a bias element for the at least one band 150 to rest against in holding the attachment unit 110 to the plant. The hooks 122 may be any suitable shape, size, and placement to retain the band 150 against the plant. In one example, the hooks 122 may be protrusions located within the interior volume of the body 120. In another example, the hooks 122 may be located at a point to evenly distribute force along the attachment unit 110. Depending on the design, this may be the center of the body 120 or a center of mass of the attachment unit.

In one example, the body 120 may have a hollow center that allows a user to connect the band 150 by hand, without any specialized tools or equipment. The hollow center may be large enough for human fingers to work in and around. In another example, the body 120 may be substantially solid. The hooks 122 may be shaped as protrusions or nooks suitable for retaining the band 150. For example, as shown in FIG. 2, the hooks 122 may include a hook head positioned on the inner terminating portion of the hook 122, where the hook head is sized to have a larger thickness than the structure connecting it to the body 120. The hook head may be used to prevent inadvertent slipping of the band 150 from the hook 122.

The band 150 may be any suitable material for retaining the attachment unit against the plant, including rubber or elastics, thread, rope, string, elastic, polymer, paper, metal, wood, hook-and-loop, and the like. In one example, the band 150 may allow the attachment unit 110 to be retained against the plant such that the plant's orientation is biased in favor of the attachment unit 110's placement. The band 150 may be sized to fit any desired thickness of plant branch, stalk, vine, or leaf. In one example, the band 150 may include a tab to assist a user in securing or tying it. The system 100 includes at least one band 150 to connect the attachment units 110, 210 and a plant. In one example, the system 100 may include a plurality of bands 150, for example, one band per attachment unit 110.

A linking head 130 is connected to the body 120. The linking head 130 may be substantially circular in shape. In one example, the linking head 130 includes a substantially circular member having a substantially circular hole 136 therethrough. The hole 136 may be sized and shaped to link with the linking base 240 of another attachment unit 210, described in greater detail below. The substantially circular shape of the linking head 130 may allow it to rotate or pivot against the body 220 and linking base 240 of the second attachment unit 210.

A linking base 140 is connected to the body 120. In one example, the linking base 140 may be connected opposite the linking head 130. The linking base 140 may be sized and shaped to fit together with the linking head 230 of another attachment unit 210. In one example, the linking base 140 may be substantially circular. By way of example, FIG. 2 shows a linking base 140 having a central hole 146. The linking base 140 may include snapping members 148. The snapping members may be flexible when pressed toward the center, and they may be sized and shaped to allow the linking base 140 to snap together with the linking head 230 of another attachment unit 210. The attachment units 110, 210, may be snapably connected by the snapping members 148 and the linking head 230, where the two attachment units 110, 210 may be fit together at the linking base 140 and the linking head 230, then pushed into a locking position. The snapping members 148 may snap outward to provide a retaining bias against the linking head 230. The attachment units 110, 210 may be removable by pushing the snapping members 148 inward.

The linking head 130 and the linking base 140 may have a tab 142, a plurality of grooves 132, 133, 134, or a combination of both. By way of example, FIG. 2 shows a linking head 130 having 3 grooves, 132, 133, 134, and a linking base 140 having 1 tab. The grooves 132, 133, 134 may be sized and shaped to fit with the tab 142 of another attachment unit 210. The tab 142 and plurality of grooves 132, 133, 134 may be provided in any combination and order suitable to allow multiple attachment units 110, 210 to have selectable angular positions, as shown in FIGS. 3A-3C. For example, the 3 grooves 132, 133, 134 on the linking head 130 are positioned to allow the tab 142 to fit into central, left, and right angular positions. In another example, more grooves may be included to allow for great angular deviation. In another example, fewer grooves may be provided, but at fixed angles. In yet another example, multiple tabs 142 may be provided to increase the bias integrity of the system 100. In yet another example, each linking base 130 and linking head 140 include a combination of grooves and tabs. As is further shown in FIG. 2, the grooves 132, 133, 134 may be formed with various structures on the attachment units 11, 210, for example, where a middle groove 133 is formed from the near contact between two legs, and where the outer grooves 132, 134 are formed as indentations within the legs. In this construction, the lack of a structural connection between the legs forming groove 133 may allow each of the legs to flex slightly, which in turn allows for slight deflections of the position of the grooves 132, 133, 134 when the tab 142 is moved between the grooves 132, 133, 134.

Any attachment unit 110 may be interchangeable with any other attachment unit 210 when the attachment units 110, 210 are substantially identical. It should be noted, with respect to any discussion of linking heads 130, 230 and linking bases 140, 240, that any linking head 130, 230 may connect with any linking base 140, 240 to form the system 100 discussed herein. Additionally, any number of attachment units may be combined to form a system 100 of desired length, ability, angular position, and the like. For example, 3 attachment units 110 may be linked together to direct a small plant. For larger plants, 4 or more attachment units 110 may be linked together. Multiple systems 100 may be placed at different points on a single plant, as is discussed in FIG. 5, below.

FIGS. 3A-3C are elevation views of angular positions of a system 100 for directing plant growth, in accordance with the first exemplary embodiment of the disclosure. FIG. 3A shows a system 100 angularly positioned at a leftward angle; FIG. 3B shows a system 100 angularly positioned at a straight angle; FIG. 3C shows a system 100 angularly positioned at a right angle. In FIGS. 3A-3C, attachment units 210 are linked or connected with attachment units 110. In particular, the linking bases 240 of attachment units 210 are linked with the linking heads 130 of attachment units 110.

In FIG. 3A, attachment unit 210 is positioned so that groove 232 fits with tab 142. In FIG. 3B, attachment unit 210 is positioned so that groove 233 fits with tab 142. In FIG. 3C, attachment unit 210 is positioned so that groove 234 fits with tab 142. In implementation, the system 100 in each of the angular configurations of FIGS. 3A-3C may be connected to a plant in order to direct the growth of the plant according to that particular angular configuration.

Figure 4B:
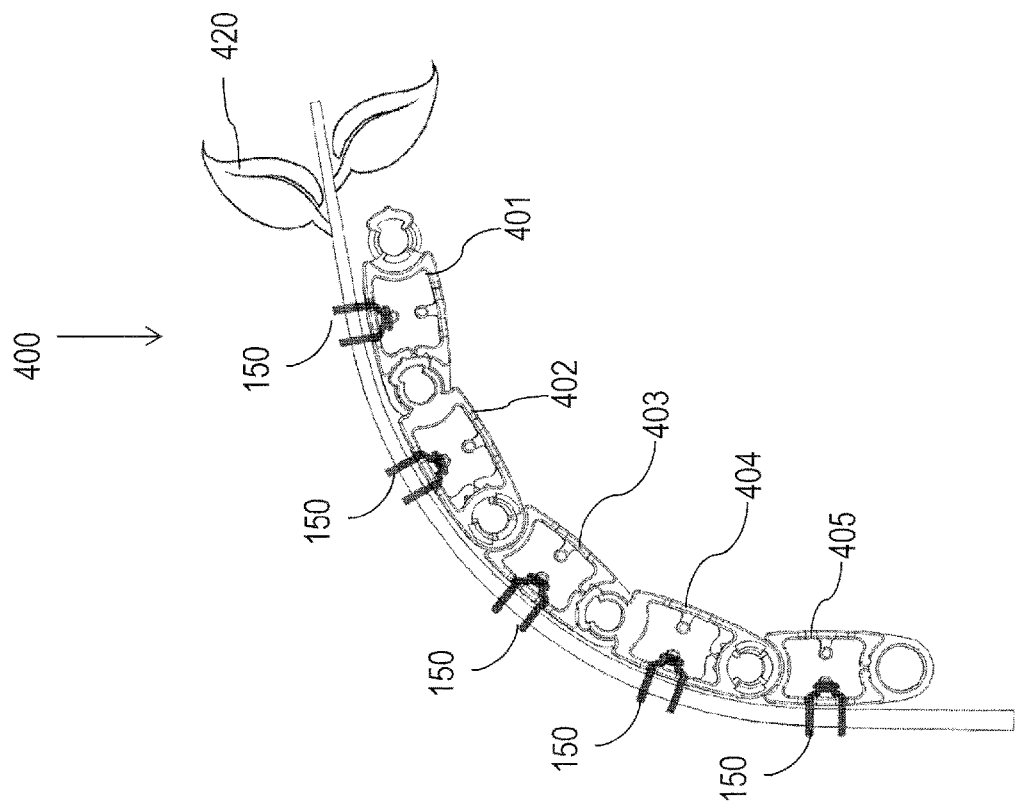
FIGS. 4A-4B are elevation views of the system for directing plant growth, in accordance with the first exemplary embodiment of the present disclosure.
Figure 4A:
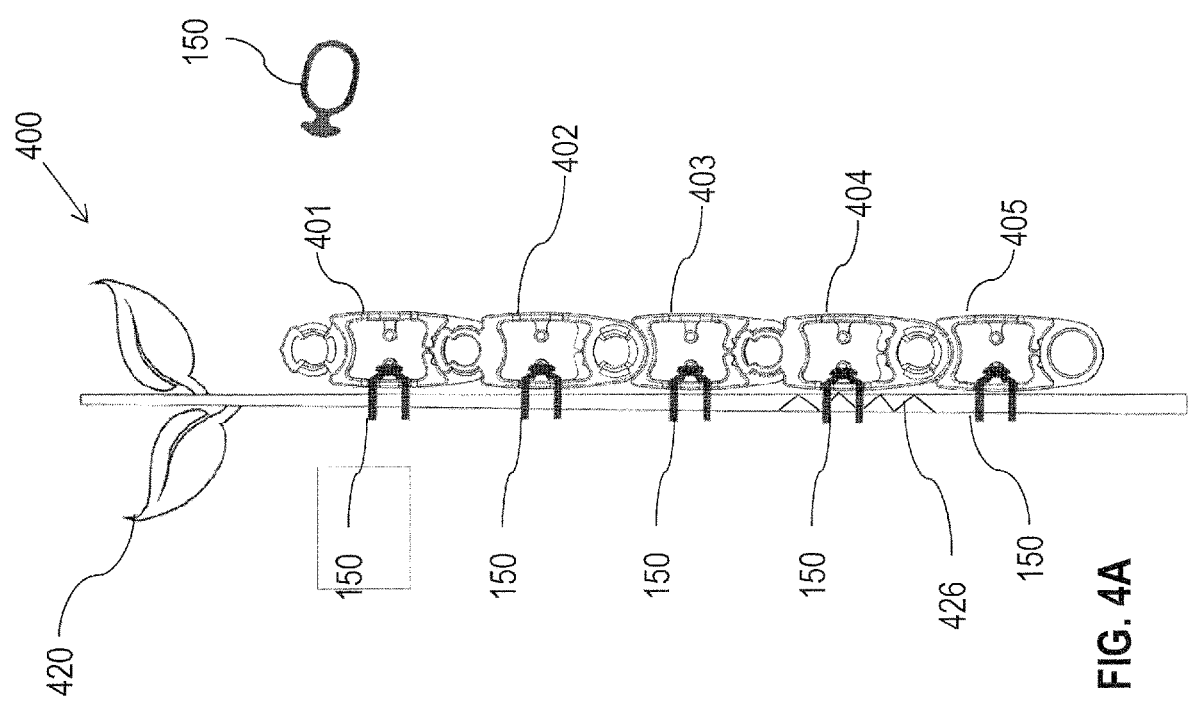

FIGS. 4A-4B are elevation views of a system 400 for directing plant growth, in accordance with the first exemplary embodiment of the present disclosure. The system 400 includes a first attachment unit 401 and a second attachment unit 402, both units being identical. By way of example, FIGS. 4A-4B show a system 400 including additional attachment units 403, 404, 405. The system 400 may include as many attachment units as necessary to direct the growth of a plant 420, which may also be included in the system 400. The attachment units 401-405 may include the body, linking head, linking base, tab, and plurality of grooves as described relative to FIGS. 1-3C. The attachment units 401-405 may also include the holes, hooks, and other characteristics of the attachment units 110, 210 described relative to FIGS. 1-3C. The size, placement, and number of the attachment units 401-405 may be dependent on the size, heartiness, and angular deviation needed for the plant 420. Bands 150 may be wrapped around the attachment units 401-405 and the plant 420 to snugly secure the plant 420 to the attachment units 401-405. By way of example, FIGS. 4A-4B show one band 150 per attachment unit to secure the system 400 around every angular bend.

In FIG. 4A, the system 400 is configured in a straight orientation, with the attachment units 401-405 each in linear alignment with each other. This may provide vertical support to assist the plant 420 in growing straight, or it may provide a weight to correct the angle of growth of the base of the plant 420. In another example, the plant 420 is shown having a damaged stem 426. One system 404 is holding the damaged stem 426 together with band 150. The other systems 401, 402, 403, 405 are providing vertical support to the upper portion of the plant 420 so that it can grow as it mends.

In FIG. 4B, the system 400 is configured in an angular orientation, with each of the attachment units 401-405 linked at an angle. In one example, this may be achieved by first assembling the system 400 as shown in FIG. 4A, then rotating each of the attachment units 401-405 to achieve the desired angular position. As shown in FIG. 4B, a number of attachment units 401-405 each creating a small angular deviation may collectively direct a plant 420 to angles of about 90 degrees or more. The gradual bending of the plant 420 may gently direct it without causing damage to the structure of the stem. In another example, the attachment units 401-405 may not all be angled in the same direction. For instance, some attachment units 401, 402 may be angled to the right, some 403 angled straight, and some 404, 405 angled to the left. This may allow a user to create an s-curve or other desired shapes and growth trajectories for plants 420. This may allow plants 420 to be directed away from other growth and back upward at once.

Figure 5:
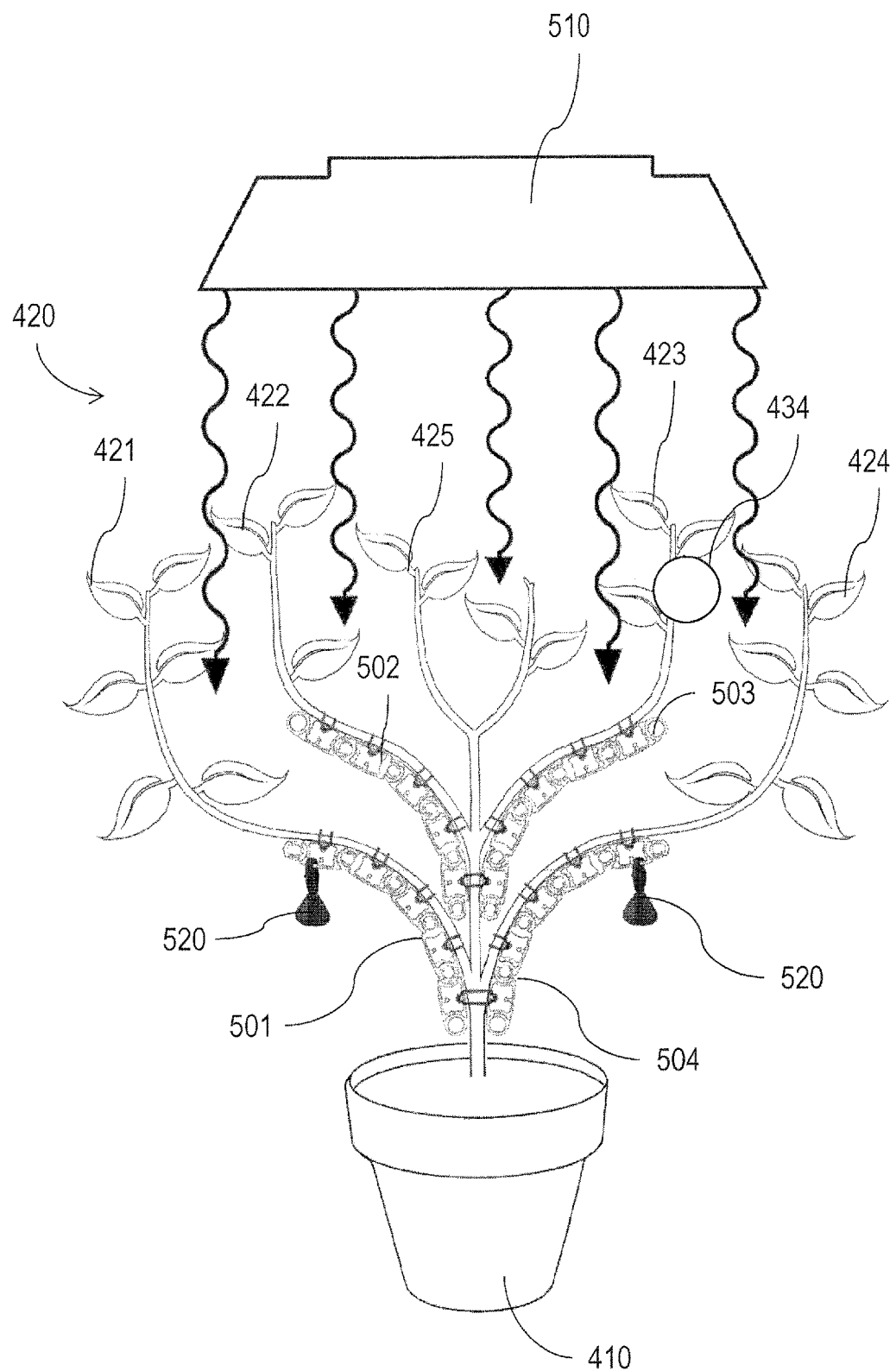
FIG. 5 is an elevation view of multiple systems for directing plant growth, in accordance with the first exemplary embodiment of the present disclosure.

FIG. 5 is an elevation view of multiple systems 501, 502, 503, 504 for directing plant growth. The systems 501, 504 may be any of the systems discussed relative to FIGS. 1-4B, above, and may be sized and located to achieve a desired direction or spread of the plant 420. A plant 420 in a pot 410 is shown having multiple stems 421, 422, 423, 424, 425. The center stem 425 may not be connected to a system, as it may be an older stem or it may have more direct access to the light 510. The light 510 may be any light source suitable for growing plants, including the Sun and indoor grow light sources. The light 510 radiates grow light at a solid angle determined by the source and any directing hardware. In FIG. 5, the light is shown radiating at an expanding angle toward the plant 420.

In order to ensure that the other stems 421, 422, 423, 424 receive enough light, the stems may be connected to directing systems 501, 502, 503, 504, respectively. As shown in FIG. 5, a moderate degree of directing is required for the stems 422, 423 closest to the center 425. The directing systems 502, 503 may be located higher up on the stems 422, 423 in order to achieve a moderate angular positioning. A larger degree of directing may be required for the stems 421, 424 located further from the center 425. Therefore, the directing systems 501, 504 may be located closer to the base of the stems 421, 424 to achieve the change earlier in the stems' growth process. Each of the systems 501-504 is shown changing the growth direction of the plant 420 by initial angles of about 90 degrees. The stems 421-424 may naturally grow upward toward the light source after initially being directed at an angle.

FIG. 5 shows that a system 504 may be used to provide vertical support for a stem 424. The system 504 may provide a sturdy base for the stem 424 to grow on. This may be helpful for young plants without strong stem bases, especially shoots and newer growth. After the stem 424 has grown strong enough, the system 504 may be adjusted or removed. In one example, the system 504 may be put on a schedule of decreasing amounts of vertical support over time. In another example, the system 503 may provide vertical support to a stem 423 with heavy fruit 434. The fruit 434 may otherwise cause the stem 423 to grow lower or away from the light 510.

FIG. 5 also shows a system 501 being used to direct the stem 421 lower than it would naturally grow. This may be done by adding one or more weights 520 at any portion of the system 501. For example, a small weight 520 may be attached to the outermost attachment unit of system 501 to achieve a maximum downward pulling force. The weight 520 may be moved inwardly to lessen the effect of the downward pulling force. The weight 520 may be temporarily or permanently attached. For instance, the weight 520 may be attachable by a band 150 shown in FIG. 1, which may be part of the weight 520, or separate from it. A plurality of weights 520 may be attached to different attachment units within the system 520. This may allow the plant 420 to achieve a desired shape or horizontal spread. In another example, one or more of the attachment units may be weighted instead of adding weight 520.

Additionally, any of the systems 501-504 may be used as a splint to repair bent stems 421-424. The bands 150 in connection with the attachment units may hold fibrous plant tissue together to allow it to mend.

FIG. 6 is a flowchart 600 illustrating a method of directing plant growth, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 610 includes linking at least a first attachment unit and a second attachment unit, wherein the attachment units are identical, and wherein each attachment unit comprises: a body; a linking head connected to the body and having at least one of: a tab and a plurality of grooves, wherein the linking head is substantially circular in shape; and a linking base connected to the body and having another of: a tab and a plurality of grooves, wherein the linking base of the first unit is sized to fit together with the linking head of the second unit. The attachment units may be any of the attachment units described relative to FIGS. 1-5, above. Any number of attachment units may be linked together. For example, 3 or more attachment units may be linked, depending on the needs of the plant.

Step 620 includes positioning the linked attachment units against a stem of a plant. One side of the linked attachment units may be placed alongside the stem of the plant. In one example, the linked attachment units may be placed alongside only a portion of the stem, for instance, a bottom portion or a middle portion. This may allow any portions of the plant driving growth to grow freely in a natural direction.

Step 630 includes connecting at least one band between the attachment units and the plant. The band may be any of the bands discussed relative to FIGS. 1-5, above. In one example, each attachment unit may be connected to the plant by a band. In another example, the portion of the stem having linked attachment units may change as the plant grows. For instance, as the plant begins to grow out and towards a light source, attachment units may be gradually removed. This may allow the plant to grow naturally without any additional stress on the stem. In another example, the attachment units may be gradually added as the plant grows. This may ensure that the plant continues to grow in a desired direction.

Step 640 includes angularly positioning the plant by placing the tab into one of the plurality of grooves. This may include rotating one or more of the attachment units, depending on the number of attachment units, the desired growth path of the plant, and the amount of space available. The angle may be adjustable over time. A user may decide to increase or lessen the angle of the linked attachment units by moving the tab of one unit to a different groove. In one example, this may be done without unlinking the attachment units. The tab and its associated attachment unit may simply be moved from a first groove to a second groove, from a second groove to a third groove, and so on. The plant may follow a schedule of angular adjustment depending on how well it grows or where other stems or plants are growing. This may cause the angular deviation of the plant to increase or decrease in order to accommodate changing conditions.

The plant may be directed for a number of reasons. For instance, a weak plant may be propped up by the linked attachment units acting as a stake. This may allow the plant to exist in an optimal location until it is strong enough to support itself. An injured plant may be held together by the linked attachment units acting as a splint. This may allow the plant to heal under optimal light and growth conditions. A strong plant may be horizontally or translationally directed to an area where light is more readily available, and the plant has room to grow. An older plant may be translationally directed to an open area to allow a younger plant to grow where it previously was. This may ensure even growth and higher yield, since the plants or stems will be subject to more optimal lighting conditions. A compact plant may simply be directed to spread out for aesthetic purposes—to cover a larger area or to fit within a space. This may allow gardeners to maintain a desired visual look.

The method may further include any other features, components, or functions disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for directing plant growth, comprising:
   a first attachment unit and a second attachment unit, wherein the attachment units are identical, and wherein each attachment unit comprises:
   a body;
   a linking head connected to the body and having at least one of: a tab and a plurality of grooves, wherein the linking head is substantially circular in shape; and
   a linking base connected to the body and having another of: a tab and a plurality of grooves, wherein the linking base of the first unit is sized to fit together with the linking head of the second unit, and wherein the linked attachment units are angularly positionable by placing the tab into one of the plurality of grooves; and
   at least one band connectable between the attachment units and a plant.

2. The system of claim 1, further comprising a third attachment unit identical to the first and second attachment units, and wherein the linking base of the second unit is sized to fit together with a linking head of the third unit.

3. The system of claim 1, wherein the first and second attachment units each comprise a hook connected within the body, and wherein the at least one band is connectable to the attachment units at the hook.

4. The system of claim 1, wherein the linking base of one attachment unit is snapably connectable to the other attachment unit.

5. The system of claim 1, further comprising a weight attached to at least one of: the first attachment unit and the second attachment unit.

6. The system of claim 1, wherein the linked attachment units are adjustable between at least a straight, a leftward, and a rightward angular position.

7. The system of claim 1, wherein the linking head of each attachment unit comprises at least three grooves, and wherein the linking base of each attachment unit comprises at least one tab.

8. A system for directing plant growth, comprising:
   a first attachment unit and a second attachment unit, wherein the attachment units are identical, and wherein each attachment unit comprises:
   a body;
   a linking head connected to the body and having at least one of: a tab and a plurality of grooves, wherein the linking head is substantially circular in shape; and
   a linking base connected to the body and having another of: a tab and a plurality of grooves, wherein the linking base of the first unit is sized to fit together with the linking bead of the second unit, and wherein the linked attachment units are angularly positionable by placing the tab into one of the plurality of grooves;
   a plant; and
   at least one band connectable between the attachment units and the plant, wherein the plant is directed according to the angular position of the linked attachment units.

9. The system of claim 8, wherein the first and second attachment units each comprise a hook connected within the body, and wherein the at least one band is connectable to the attachment units at the hook.

10. The system of claim 8, wherein the linking base of one attachment unit is snapably connectable to the other attachment unit.

11. The system of claim 8, further comprising a weight attached to at least one of: the first attachment unit and the second attachment unit.

12. The system of claim 8, wherein the linked attachment units are adjustable between at least a straight, a leftward, and a rightward angular position.

13. A method of directing plant growth, comprising the steps of:
   linking at least a first attachment unit and a second attachment unit, wherein the attachment units are identical, and wherein each attachment unit comprises:
   a body;
   a linking head connected to the body and having at least one of: a tab and a plurality of grooves, wherein the linking head is substantially circular in shape; and
   a linking base connected to the body and having another of: a tab and a plurality of grooves, wherein the linking base of the first unit is sized to fit together with the linking head of the second unit;
   positioning the linked attachment units against a stem of a plant;
   connecting at least one band between the attachment units and the plant; and
   angularly positioning the plant by placing the tab into one of the plurality of grooves.

14. The method of claim 13, further comprising linking a third attachment unit identical to the first and second attachment unit.

15. The method of claim 13, wherein the plurality of grooves comprises first and second grooves, and further comprising the step of moving the tab from the first groove to the second groove.

16. The method of claim 13, wherein the linked attachment units are adjustable between at least a straight, a leftward, and a rightward angular position.

17. The method of claim 13, wherein the attachment units are angularly positioned to provide translational movement for the plant.

18. The method of claim 13, wherein the attachment units are angularly positioned to provide downward vertical direction for the plant.

19. The method of claim 13, wherein the attachment units are angularly positioned to provide upward vertical support when the plant is too heavy to support itself.

20. The method of claim 13, wherein the attachment units are angularly positioned to provide splint support when the plant is damaged.

* * * * *